May 14, 1946.    J. G. HOOLEY    2,400,147
FLUORESCENT GLASS COMPOSITION
Filed July 17, 1942
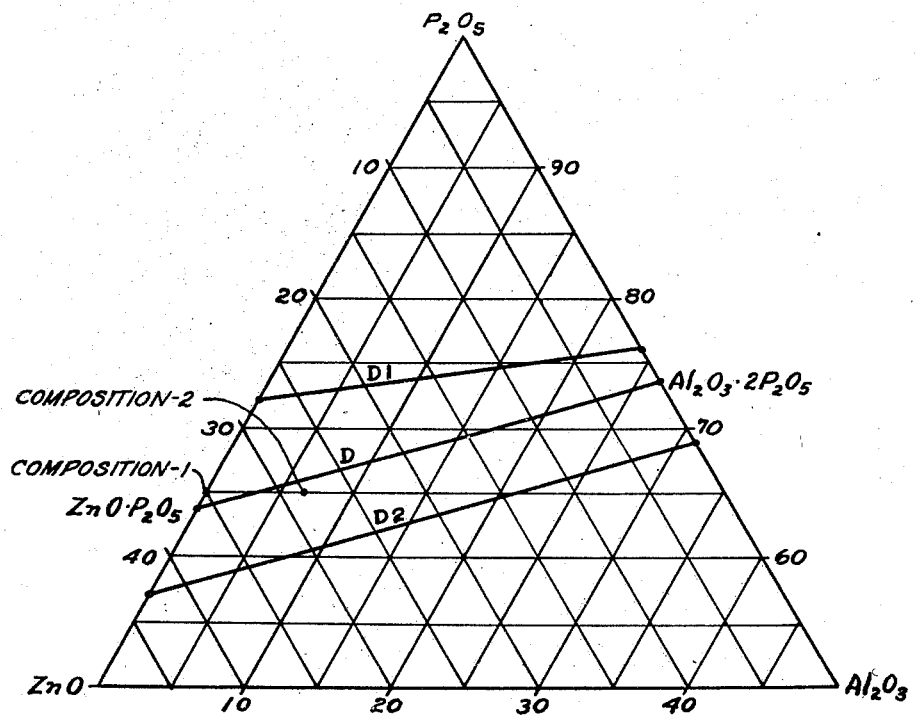
Inventor
JOSEPH G. HOOLEY
By
F. N. Knight
Attorney Patented May 14, 1946

2,400,147

UNITED STATES PATENT OFFICE 2,400,147

FLUORESCENT GLASS COMPOSITION

Joseph Gilbert Hooley, Corning, N. Y., assignor to Corning Glass Works, Corning, N. Y., a corporation of New York Application July 17, 1942, Serial No. 451,345

9 Claims. (Cl. 252—301.6)

This invention relates to glasses which will fluoresce when exposed to ultra-violet radiations. Such glasses are useful and desirable as enclosing tubes for luminous discharge devices and particularly for the low pressure mercury arc, the light from which is rich in ultra-violet radiations having a wave length of 254 m$\mu$.

An object of the invention is to produce a fluorescent glass which will be particularly sensitive to wave length 254 m$\mu$ and which will convert it to visible light in larger proportion than prior glasses.

Another object is to produce a luminous discharge device the emitted light from which will closely approximate noon sunlight in character.

Another object is to produce a low pressure mercury lamp which will emit more lumens per watt than prior lamps.

The above and other objects may be accomplished by introducing tin or tin and manganese as fluorescing metals into a glass which consists of $P_2O_5$ and ZnO, the molecular ratio of $P_2O_5$ to ZnO being from 0.75 to 1.5, and, if desired, additionally containing aluminum phosphate ($Al_2O_3 \cdot 2P_2O_5$).

Tin and manganese are known fluorescing agents and it is known to use them in phosphate glasses, as is taught in Patent No. 2,042,425. However, the compositions given in the patent contain no zinc and some of them contain large amounts of alkali metal oxides or boric oxide, substantial quantities of which I have found to weaken the fluorescence of tin and manganese. The maximum light value or total visible light emitted by the glasses of the patent, when made into a mercury discharge tube is 11.2 which is about 6.2 times that of a tube of the same construction and current input but made of ordinary glass, the latter being 1.8. My new glasses are substantially free from alkali metal oxides and boric oxide and have as much as twice the efficiency of the prior glasses.

I have discovered that, in a glass consisting approximately of the equimolecular binary composition $ZnO \cdot P_2O_5$ or any mixture of the binaries $ZnO \cdot P_2O_5$ and $Al_2O_3 \cdot 2P_2O_5$, the fluorescence of tin and manganese is particularly high and the physical properties are generally favorable for flashing or otherwise coating tubes or other enclosures for luminous discharge devices.

The following compositions, in percent by weight exclusive of the fluorescing agent as calculated from the batches, illustrate glasses falling within the scope of the invention, the fluorescence or light value being expressed in terms of lumens per watt which are produced when the glasses are employed as enclosures for the low pressure mercury arc:

|  | 1 | 2 |
|---|---|---|
| $P_2O_5$ | 65 | 65 |
| $Al_2O_3$ |  | 7 |
| ZnO | 35 | 28 |
| SnO | 3 | 3 |
| MnO | 0.8 | 0.8 |
| Lumens/watt | 39 | 40 |

The drawing will further illustrate the invention.

In the figure there is shown in percent by weight a triaxial diagram which represents a portion of the Ternary System $ZnO \cdot Al_2O_3 \cdot P_2O_5$ showing the range 0–50% ZnO, 0–50% $Al_2O_3$, and 50–100% $P_2O_5$. Line D is drawn between the points representing the binary composition $Al_2O_3 \cdot 2P_2O_5$, which is equivalent to approximately 26.4% $Al_2O_3$ and 73.6% $P_2O_5$, and the binary composition $ZnO \cdot P_2O_5$, which is equivalent to approximately 36.3% ZnO and 63.7% $P_2O_5$. All compositions falling on line D are mixtures of these two binary compositions and may be expressed in molecular proportions as $$X(ZnO \cdot P_2O_5) + (1-X)(Al_2O_3 \cdot 2P_2O_5)$$

where X is the mol fraction of $ZnO \cdot P_2O_5$.

Low pressure mercury arc lamps enclosed by envelopes of fluorescent glasses, the base compositions of which are represented by points on or in the immediate neighborhood of the line D and which contain tin or tin and manganese, will produce about 40 lumens per watt. For example, the points designated "Composition 1" and "Composition 2" in the drawing show the relative positions of the above described glasses 1 and 2 respectively with reference to the D line and lamps made from these glasses produce 39 lumens and 40 lumens per watt respectively. A similar lamp enclosed in an ordinary clear non-fluorescent glass, on the contrary, will produce only about three lumens per watt under the same conditions. Thus it will be seen that my new glasses are about 13 times as effective as non-fluorescent glasses and are about twice as effective as the fluorescent glasses of the above mentioned patent.

The full scope of zinc aluminum phosphate glasses, according to my invention, lies between lines $D_1$ and $D_2$ which, in the manner similar to that described above, are defined molecularly as $$X(ZnO \cdot 1.5P_2O_5) + (1-X)(Al_2O_3 \cdot 2.3P_2O_5)$$

and $$X(ZnO \cdot 0.75P_2O_5) + (1-X)(Al_2O_3 \cdot 1.6P_2O_5)$$

respectively, where X is the mol fraction of the zinc phosphate.

In the glasses thus defined, tin or tin and manganese give a high yield of visible light, as stated above. Tin, which is particularly sensitive to excitation by wave length 254 m$\mu$, fluoresces with a bluish white light. Only the near or long wave ultra-violet excites manganese to fluorescence and such radiations are substantially absent from the low pressure mercury arc. However, I have found that the combination of manganese with tin in the phosphate glasses of my invention produces more lumens per watt from the mercury arc than tin alone. Moreover, the reddish fluorescence of the manganese combined with the bluish white fluorescence of the tin produces a very close approximation of noon sunlight. Various compounds of tin and manganese may be used in amounts equivalent approximately to 2% to 12% SnO and up to 2.5% MnO. Inasmuch as I have found that the above described high fluorescent efficiency of my glasses is obtained when the glass is melted reducingly, it is advantageous to use stannous and manganous compounds such as chlorides. Carbonaceous materials, such as sugar, starch, charcoal, etc., may be employed as reducing agents.

I have found that the presence of at least 4% of alumina is desirable because the binary glasses, although suitable for some purposes, are not sufficiently stable for all purposes and the stability is improved by the presence of alumina. However, too much alumina causes difficult melting. Therefore, as the preferred embodiment of my invention within the broader limits of the system defined in the figure, the following compositions are given as ternary base glasses in terms of weight percentage, the fluorescing agents being considered as additional in terms of weight percentage of the base glass:

| | Per cent |
|---|---|
| $P_2O_5$ | 60–71 |
| ZnO | 20–35 |
| $Al_2O_3$ | >4 |

To the above glasses is added SnO in the amount of 2%–12% of the base glass and MnO in the amount of 0–2.5% of the base glass. For modifying the expansion coefficient and softness of the new glasses, small amounts of alkali metal oxides and boric oxide may be added without much effect on the fluorescence, but addition of more than 2% or 3% of these oxides decreases the fluorescence of the glass and hence is to be avoided in the practice of my invention.

The glasses of my invention have relatively low melting points as compared with silicate glasses, provided the alumina content is not too high. Hence luminous discharge devices of the fluorescent mercury arc can be made of my glass by using another supporting glass, preferably a silicate glass of higher melting point, and applying my glass either as a flashed layer thereon or as an internal coating of powder adhesively attached to the envelope in the manner well known in the art.

I claim:
1. A fluorescent glass the composition of which, exclusive of the fluorescing agent, falls within the limits represented by the expressions

$$X(ZnO \cdot 1.5\ P_2O_5) + (1-X)(Al_2O_3 \cdot 2.3\ P_2O_5)$$

and $$X(ZnO \cdot 0.75\ P_2O_5) + (1-X)(Al_2O_3 \cdot 1.6\ P_2O_5)$$

where X is the mol fraction of the zinc phosphate, the glass being activated by 2% to 12% of stannous oxide and having a light value of at least 20 lumens per watt.

2. A fluorescent glass the composition of which, exclusive of the fluorescing agent is represented approximately by the expression $$X(ZnO \cdot P_2O_5) + (1-X)(Al_2O_3 \cdot 2\ P_2O_5)$$

where X is the mol fraction of the zinc phosphate, the glass being activated by 2% to 12% of stannous oxide and having a light value of at least 20 lumens per watt.

3. A fluorescent glass the composition of which, exclusive of the fluorescing agent, falls within the limits represented by the expressions $$X(ZnO \cdot 1.5\ P_2O_5) + (1-X)(Al_2O_3 \cdot 2.3\ P_2O_5)$$

and $$X(ZnO \cdot 0.75\ P_2O_5) + (1-X)(Al_2O_3 \cdot 1.6\ P_2O_5)$$

where X is the mol fraction of the zinc phosphate, the glass being activated by 2% to 12% of stannous oxide and effective amounts but not more than 2.5% of manganese oxide, and having a light value of at least 20 lumens per watt.

4. A fluorescent glass the composition of which, exclusive of the fluorescing agent is represented approximately by the expression $$X(ZnO \cdot P_2O_5) + (1-X)(Al_2O_3 \cdot 2\ P_2O_5)$$

where X is the mol fraction of the zinc phosphate, the glass being activated by 2% to 12% of stannous oxide and effective amounts but not more than 2.5% of manganese oxide, and having a light value of at least 20 lumens per watt.

5. A fluorescent glass which, exclusive of the fluorescing agent, consists of 20% to 35% ZnO and 60% to 71% $P_2O_5$, the glass being activated with 2% to 12% of stannous oxide, the glass having a light value of at least 20 lumens per watt.

6. A fluorescent glass which, exclusive of the fluorescing agent, consists of ZnO, $P_2O_5$, and $Al_2O_3$, the ZnO being 20% to 35% and the $P_2O_5$ being 60% to 71%, the glass being activated with 2% to 12% of stannous oxide, the glass having a light value of at least 20 lumens per watt.

7. A fluorescent glass which, exclusive of the fluorescing agent, consists of 20% to 35% ZnO and 60% to 71% $P_2O_5$, the glass being activated with 2% to 12% of stannous oxide and effective amounts but not more than 2.5% of manganese oxide, and having a light value of at least 20 lumens per watt.

8. A fluorescent glass which, exclusive of the fluorescing agent, consists of ZnO, $P_2O_5$ and $Al_2O_3$, the ZnO being 20% to 35% and the $P_2O_5$ being 60% to 71%, the glass being activated with 2% to 12% of stannous oxide and effective amounts but not more than 2.5% of manganese oxide, and having a light value of at least 20 lumens per watt.

9. A fluorescent glass which, exclusive of the fluorescing agent, consists of a mixture of $ZnO \cdot P_2O_5$ and $Al_2O_3 \cdot 2P_2O_5$, the glass being activated with 2% to 12% of stannous oxide and having a light value of about 40 lumens per watt.

JOSEPH GILBERT HOOLEY.